Nov. 14, 1939.  H. E. KIP  2,179,824

FLUID MOVING MACHINE

Filed March 27, 1935

INVENTOR
HENRY E. KIP
BY
ATTORNEY

Patented Nov. 14, 1939

2,179,824

UNITED STATES PATENT OFFICE 2,179,824

FLUID MOVING MACHINE

Henry E. Kip, Lakewood, Ohio, assignor, by mesne assignments, to Union Carbide and Carbon Corporation, a corporation of New York Application March 27, 1935, Serial No. 13,202

7 Claims. (Cl. 308—36.2)

The invention pertains in general to fluid moving machines such as pumps, fans, blowers, and the like, and more specifically to bearings and seals for machines having a rotary shaft extending through a fluid separating wall having different fluids or different pressures on opposite sides.

In machines of this type it has been the custom heretofore to equip the shaft with a stuffing box to seal the opening where the shaft extends through the casing. These stuffing boxes however, have been a source of trouble because they require frequent lubrication, become contaminated with grit, score the shaft, wear rapidly, require frequent adjustment, and cause much loss and inconvenience from leakage.

In place of the conventional stuffing boxes fiber thrust washers have been proposed to seal the shaft against leakage, but they are unsatisfactory because they require constant lubrication, frequent adjustment, and wear rapidly and leak when not lubricated. For the purpose of overcoming the need of frequent adjustment such thrust bearings have been provided with springs to hold the bearing surfaces in contact but they are unsatisfactory because they still require a constant application of lubricant and soon wear and leak when the supply is interrupted.

In place of stuffing boxes tapered bearings have also been proposed, but they, likewise, are unsatisfactory because they also require constant lubrication and wear rapidly and soon leak when the supply of lubrication is obstructed or exhausted. Split graphite bearings have also been proposed but split bearings are always a source of leakage. Glass bearings both with and without packing, have been proposed for use without lubrication, but they are limited to very slow speeds under conditions entirely free from dirt and grit since the least grit will start the dry glass to cutting and soon ruin the polished glass bearing surfaces.

Rotary thrust bearings have also been provided with grooves or vanes to prevent entrance of grit, but such expedients are effective only where operation is substantially continuous, since grit will enter when the pump is stopped and cause rapid wear when the pump is again started.

Therefore, the chief objects of the invention are to provide bearings and seals for rotary pumps, fans, and the like, that do not leak, require no lubrication, wear longer than those employed heretofore, effectively exclude dirt and grit, and require no attention or adjustment throughout their life. These and any other objects and novel features will be more fully described in the following specification and the accompanying drawing, in which.

Figure 1:
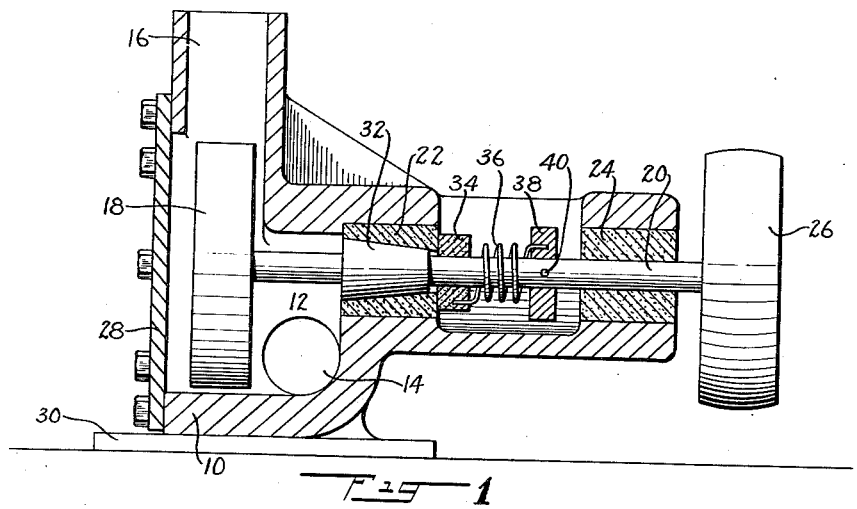
Fig. 1 is a vertical sectional view of a rotary pump embodying one application of the invention; and

The invention may be embodied in any rotary pump, fan, blower, or other rotary fluid moving machine such as those shown by the drawing which are representative examples of water pumps employed on automobile engines, and for purposes of brevity and simplicity the description of the invention will be confined to these applications since the requirements are especially exacting and prior expedients have been especially troublesome.

As shown in the drawing, the rotary water pump may comprise a casing 10 provided with a fluid chamber 12 having an inlet 14 and an outlet 16. The fluid chamber 12 may be provided with a rotor or impeller 18 that is operably mounted on a shaft 20, which is journaled in bearings 22 and 24 secured to the housing 10, and provided with driving means such as a pulley 26. A portion 28 of the casing 10 may be removable for purpose of assembling the pump, and the casing 10 may be provided with suitable supporting or attaching means such as a base 30.

The shaft 20 may be of any suitable material although to prevent corrosion, rusting, etc., a corrosion resisting material is preferred such as stainless steel, of which one of the softer grades is preferred because it machines more easily and takes a high polish more readily.

The shaft may also be of carbon or machine steel and corrosion may be prevented by providing the shaft with an electro-deposited coating of nickel, chromium, or other suitable metal. As a coating, however, a layer of chromium over a base of nickel is preferred to chromium alone, and best results have been obtained with a coating consisting of layers of nickel, copper, nickel, and chromium, applied in the order named so that the total thickness of the four layer coating is about .0005 inch.

The bearing 22 may be in the wall of the fluid chamber 12 through which the shaft 20 extends, and the bearing 24 may be spaced a suitable distance from this wall to provide a stable support for the shaft and suitable space between the journals for a thrust bearing.

The bearings 22 and 24 may be of any suitable material such as carbon or a carbonaceous material, of which moulded and baked carbon composed of a mixture of artificial graphite and ungraphitized pitch coke has been found satisfactory.

To provide a continuous supply of lubricant for the rotating shaft the bearings 22 and 24 may be provided with a suitable filling of lubricating material having such a consistency that within the range of operating temperatures it softens somewhat and forms a more or less viscous film of such wetting property with respect to the metal shaft that it is not replaced by the liquid phase being pumped. This not only provides an adequate and continuous supply of lubricant, but it also constitutes an effective seal against the liquid being forced along the joint between the shaft and bearing.

Although any suitable lubricating material may be employed, those providing a high surface tension film on the surfaces of the shaft and bearings are preferred, and of such materials the solid lubricants such as fats and waxes are preferable. Examples of such lubricants are lead oleate, chlorinated naphthalene, stearic acid, scale wax (crude soft paraffin wax obtained from petroleum), and the like. These materials may be employed separately or in combination according to surrounding conditions such as temperature, speed, material handled, ets. However, for water pumps such as those used on automobiles, a mixture of stearic acid and either scale wax or some suitable form of chlorinated naphthalene is preferred, and although any suitable proportion of the ingredients may be used, superior results have been obtained with mixtures composed of substantially equal parts by weight of the ingredients employed.

The amount of lubricating material in the bearings may vary through a relatively large range, although an amount less than 15 per cent. of the weight of the dry bearings is preferred, and for automobile water pumps amounts between 3 per cent. and 10 per cent. of the weight of the bearings have given the best results.

The lubricating material may be applied to the bearings by any suitable method such as immersing the bearings in a suitable solution of lubricating material and solvent, then removing the bearings and evaporating the solvent. The amount of lubricant in the bearings may be varied by varying the strength of the impregnating solution, the length of immersion, and the temperature of the solution. As an example, a 3 per cent. to 4 per cent. impregnation of equal parts of scale wax and stearic acid may be obtained by using a solution consisting of 15 per cent. lubricant and 85 per cent. carbon tetrachloride. The previously dried bearings are placed in the warm solution and maintained at a temperature of 60 degrees C. for 15 minutes, and then allowed to cool in the solution to 40 degrees C. at which time they are removed and dried for 15 minutes at a temperature of 125 degrees C. In the same manner, a 6-7 per cent. filling may be obtained by using a solution composed of 40 per cent. of the mixture of scale wax and stearic acid and 60 per cent. of solvent, and an 8.5-9.5 per cent. filling by using a solution of 75 per cent. lubricant and 25 per cent. solvent.

In using a lubricant composed of a mixture of chlorinated naphthalene and stearic acid slightly different proportions are necessary. For example, a 3-4 per cent. filling may be obtained by using a solution of 15 per cent. lubricant and 85 per cent. solvent, a 6-7 per cent. filling by using a solution of 30 per cent. lubricant and 70 per cent. solvent, and an 8.5-9.5 per cent. filling by using a solution of 55 per cent. lubricant and 45 per cent. solvent.

The amount of filling may be further varied by varying the strength of the solution, and a filling about 14 per cent. of the weight of the bearings may be obtained by maintaining the bearings in a molten lubricant, such as those described, at 150 degrees C. for 1½ hours.

In addition to the lubricating and sealing features already described, the bearing in the wall of the fluid chamber may be provided with other features to further seal the chamber against leakage, and maintain the seal over a relatively long period of use.

In the embodiment shown in Fig. 1 the bearing in the wall of the fluid chamber may be provided with a bearing surface having a form other than cylindrical or a form in which one end is larger than the other so that axial movement of a shaft bearing of corresponding shape tends to maintain the bearing surfaces in proper operating relation.

Although the bearing surface of bearing 22 may be of any suitable shape other than straight, a conical shape is preferred and the shaft 20 may be provided with a bearing or bushing 32 having an outer bearing surface corresponding in shape to the inner surface of bearing 22.

The bearing 32 may be of any suitable bearing material, but a carbonaceous material similar or identical with that of bearings 22 and 24 is preferred. Also, the bearing surfaces of bearings 22 and 32 may have a form that tapers in either direction, although one that tapers outwardly toward the interior of the fluid chamber 12 is preferred, since a form having the larger diameter at the end facing the fluid chamber tends to force any fluid entering the bearing back into the fluid chamber by the centrifugal force imparted to the entrapped fluid by the rotating inner bearing. Where conditions are different from those shown in Fig. 1 and the fluids are differently disposed, the large end of the bearing surfaces should be at the side of the separating wall on which the heavier fluid is disposed.

To maintain the bearing surfaces of the bearings 22 and 32 in suitably close contact, the bearing 32 may be rigidly fixed with respect to the shaft 20 and means may be provided tending to urge or move the shaft in an axial direction toward the small end of the bearing 22. This means may be termed an automatic adjusting means or more briefly a resilient thrust bearing.

This thrust bearing may be of any suitable type or form, although one having an automatic or resilient thrust movement, and one located in an accessible position outside the fluid chamber is preferred. Such a thrust bearing may consist of a suitable bearing member 34 surrounding the shaft 20 between the bearings 22 and 24, and provided with a bearing surface on one face thereof in contact with the outer end or face of bearing 22.

The bearing member 34 may be provided with any suitable means tending to move it along the shaft in a direction toward the bearing 22 such as a resilient member or spring 36 encircling shaft 20 and having one end thereof fixed to bearing 34 and the other end fixed to a suitable abutment or collar 38 fixed or secured to shaft 20 a suitable distance from bearing 22 by a suitable or conventional fastening such as a pin 40. Although the spring 36 may exert any suitable thrust or pressure which may be different under different conditions such as size, use, etc., in a pump such as that shown having a shaft ⅝ of an inch in diameter, a spring or thrust pressure from 5 to 10 pounds has been found satisfactory, and a pressure between 6 and 8 pounds has been found preferable. The bearing 34 may be of any suitable bearing material although a carbonaceous material similar or identical with that of bearings 22 and 24 is preferred.

Figure 2:
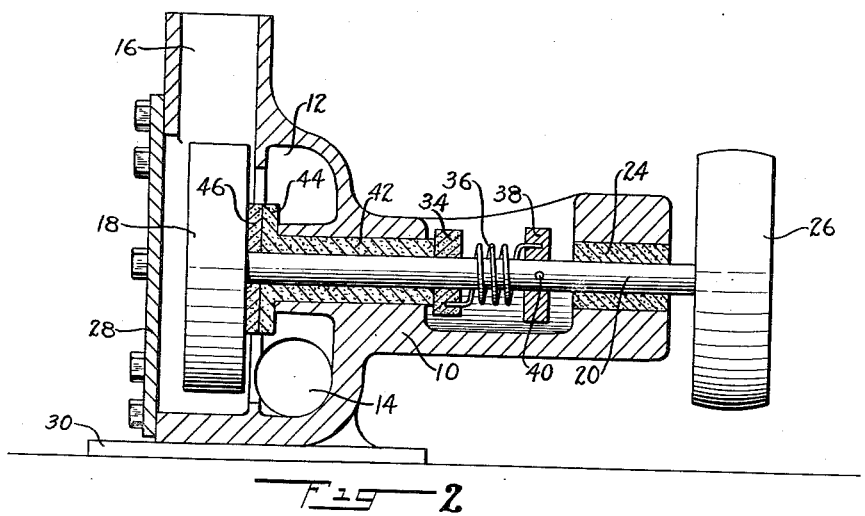
Fig. 2 is a similar view of a similar pump embodying another application of the invention.

In the embodiment shown in Fig. 2 the structure of the pump is similar to that shown in Fig. 1 with the exception of the bearing in the wall of the fluid chamber. Instead of being tapered this bearing 42 may be provided with a straight or cylindrical bearing surface closely fitting shaft 20 and a plane or flat bearing surface transverse to the axis of the shaft. To provide these bearing surfaces the bearing 42 may be provided with a cylindrical portion rigidly secured in a suitable enlargement in the casing 10 or wall of the fluid chamber 12, and an integral annular flange 44 extending outwardly from the shaft 20 within the fluid chamber 12 adjacent the impeller 18. The rotor, which comprises the rotating parts of the pump such as the shaft 20, impeller 18, etc., may be provided with any suitable bearing surface such as the inner face of the impeller in thrust contact with the flange 44, although a disk or flat annular bearing 46 rigidly secured to the shaft 20 between the impeller 18 and flange 46 is preferred.

For the purpose of holding the annular bearing 46 in operative contact with the flange 44 of bearing 42, the shaft 20 may be provided with a thrust bearing 34 that is held in operative engagement with the outer end of bearing 42 by a suitable spring 36 confined in partially compressed condition between the outer surface of bearing 34 and a thrust collar 38 rigidly secured to shaft 20 in a manner similar or identical with that shown in Fig. 1.

Although the bearings shown in Fig. 2 may be of any suitable material, the same material described in connection with the embodiment shown in Fig. 1 is preferred. Also, the thrust bearing 34 should be movable along the shaft 20 in response to the pressure of spring 36, the same as in Fig. 1, and this bearing likewise should rotate with the shaft. This rotative movement may be obtained in any suitable way although a driving connection between the bearing 34 and the thrust collar 38 by means of the spring 36 is preferred by reason of simplicity.

When the pump shown in Fig. 2 is in operation any fluid entering the joint between bearing 46 and flange 44 will be forced back into the fluid chamber 12 by the centrifugal force imparted to the entrapped fluid by the rotating thrust bearing 46. When the pump is not in operation, the close contact between bearing 46 and flange 44, which is maintained by thrust bearing 34, together with the film of lubricant on the bearing surfaces effectively prevents any leakage.

The construction and assembly of the embodiments described offer no problems not well known in the machine industry. The bearing openings in the pump casing may be drilled and line reamed as usual in such cases. The carbon bearings may be machined to a suitable size and pressed into the casing by a small press such as an arbor press. After assembly the carbon bearings may be line reamed to a suitable size and the assembly completed. During assembly any oil on the bearing surfaces should be removed since it has been found that in the construction described oil acts as a "lapping compound" and causes inferior operation.

As examples of the effectiveness of the invention described hereinbefore the following examples of operation are submitted.

The construction shown in Fig. 1 was operated under conditions identical with those in an automobile. After the pump had been in operation for a period equivalent to that of an automobile travelling a distance of over 50,000 miles, it was taken apart for the purpose of inspecting the condition of the parts. Upon examination it was found that the wear upon the bearing surfaces could not be detected or was of too small an amount to affect operation.

To determine whether the above test could be duplicated, a similar pump was placed under test which was continued for a period equivalent to more than 60,000 miles of car operation. Also, tests were conducted with the construction shown in Fig. 2 with equally satisfactory results. During these tests some of the more important wearing parts such as the carbon bearings were used through two or more periods of operation which exceeded 110,000 car miles, and even after this relatively large amount of service they were still in condition for much more. Some of the tests were continued for the equivalent of 92,000 miles without adjustment or attention, but in no case did wear or leakage cause termination.

To determine the effectiveness of the liquid seal these pumps were operated under all the various conditions encountered in service. For example, they were operated both slow and fast, continuously and intermittently, with water at various temperatures from boiling to well below zero, with the better known anti-freeze mixtures both strong and weak, with a solution both clean and containing dirt, rust, or grit, yet in none of the cases did leakage occur. Therefore, since the average automobile is driven less than 5,000 miles a year and the water pump may require adjustment several times during that period, it is evident that the present invention by which such pumps may be operated over a period of approximately 20 years of average use without need of oil, adjustment, or other attention, is a material advance in the art and highly useful.

Although the invention has been described as embodied in a water pump it is evident that it may be embodied in other fluid moving devices of various kinds where a fluid sealed bearing is desired as well as in other devices where an oilless bearing is desired. Also, various changes may be made in the structure, form, and relative arrangement of the component parts without departing from the scope of the invention or the advantages thereof.

We claim:

1. In a machine having a casing with a wall separating different fluids of which one is a liquid; a plurality of bearings mounted on said casing of which one is secured in a suitable opening in said wall; said bearings being of a solid carbonaceous material having a filling of solid lubricating material; a rotor operably mounted in said bearings; the bearing surface of the bearing in said wall in contact with the bearing surface of said rotor being larger at the end adjacent said liquid; and a resilient thrust bearing for maintaining said bearing surfaces in fluid sealing relation.

2. In a machine having a casing with a wall separating different fluids, a combined journal and thrust bearing mounted in a suitable opening in said wall; a rotor extending through said wall and operably mounted in said bearing; and a resiliently mounted thrust bearing opposing said first mentioned thrust bearing; said bearings comprising a solid carbon and a filling therein of a lubricating wax.

3. In a machine having a casing with a wall separating different fluids; a stationary bearing mounted in a suitable opening in said wall; a rotor operably mounted in said stationary bearing; a rigid thrust bearing fixed to said rotor in operative relation to said stationary bearing; and a resiliently mounted thrust bearing in operative relation to said stationary bearing for maintaining said rigid thrust bearing in fluid sealing relation with said stationary bearing; said bearings being of solid carbon having a filling of solid lubricating material that maintains a viscous lubricating film thereon.

4. In a machine having a casing with a wall separating different fluids of which one is heavier than the other; a carbon journal bearing rigidly mounted in a suitable opening in said wall; a shaft operably mounted in said journal bearing; a carbon thrust bearing rigidly mounted on said shaft in operative relation with the end of said journal bearing adjacent the heavier of said fluids; and a carbon thrust bearing resiliently mounted on said shaft in operative relation with the end of said journal bearing adjacent the lighter of said fluids to maintain the former thrust bearing in fluid sealing relation with the adjacent end of said journal bearing said carbon bearings having a filling of solid lubricant.

5. In a machine having a casing with a wall separating different fluids of which one is heavier than the other; a carbon journal bearing rigidly mounted in a suitable opening in said wall and provided with an outwardly extending flange on the side of said wall adjacent the heavier of said fluids; a shaft operably mounted in said journal bearing; a carbon thrust bearing rigidly mounted on said shaft in operative relation with said flange; a carbon thrust bearing resiliently mounted on said shaft in operative relation with the end of said journal bearing adjacent the lighter of said fluids to maintain the former thrust bearing in fluid sealing relation with said flange; said carbon bearings being provided with a filling of lubricating wax.

6. In a machine having a casing with a wall separating different fluids of which one is a liquid; a plurality of bearings mounted on said casing of which one is secured with a press-fit in a suitable opening in said wall; said bearings being of a solid carbonaceous material having a filling of solid lubricating material comprising stearic acid and scale wax; a rotor having a polished bearing surface of corrosion resisting metal operably mounted in said bearings; the bearing surface of the bearing in said wall in contact with the polished metal bearing surface of said rotor being larger at the end adjacent said liquid; and a resiliently urged thrust bearing for maintaining said bearing surfaces in fluid sealing relation.

7. In a machine having a casing with a wall separating different fluids, a combined journal and thrust bearing mounted in a suitable opening in said wall; a rotor having a bearing surface of stainless steel extending through said wall and operably mounted in said bearing; and a resiliently mounted thrust bearing opposing said first mentioned thrust bearing; said bearings comprising a solid carbon and a filling therein of a lubricating wax and stearic acid.

HENRY E. KIP.